United States Patent Office 3,425,710
Patented Feb. 4, 1969

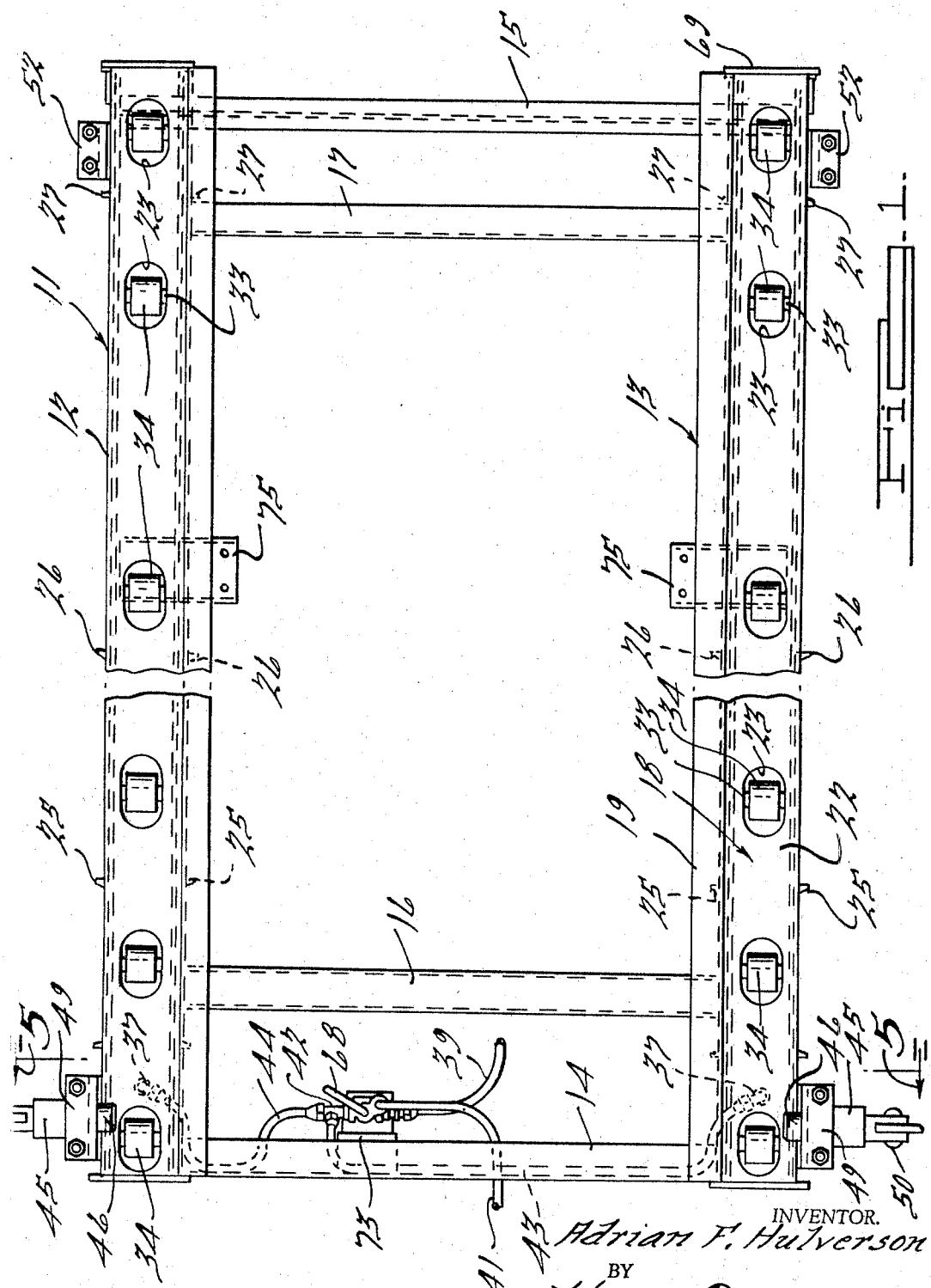

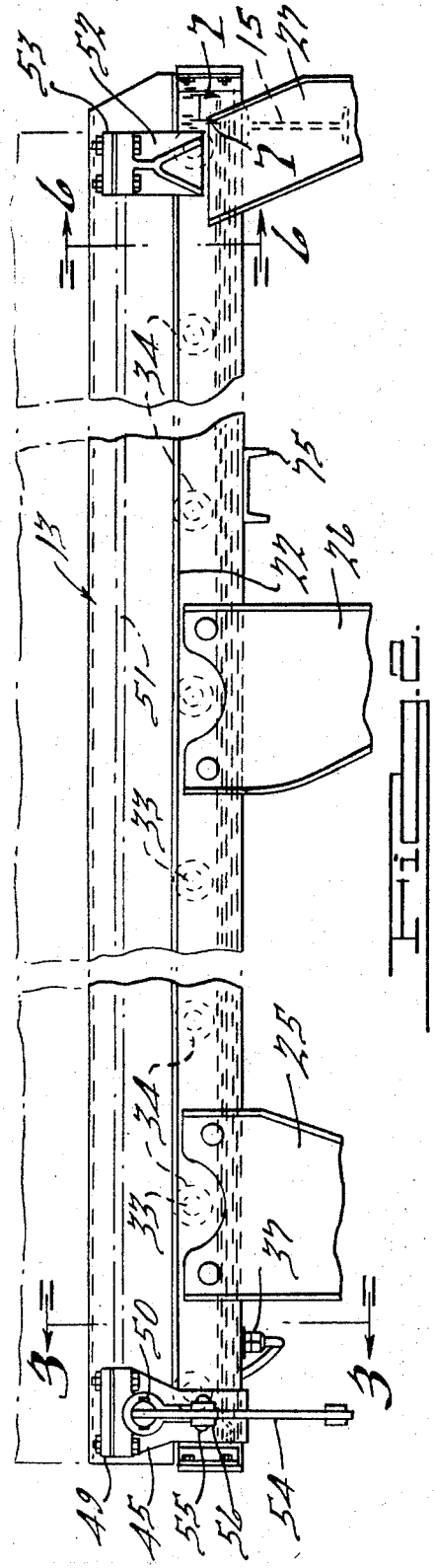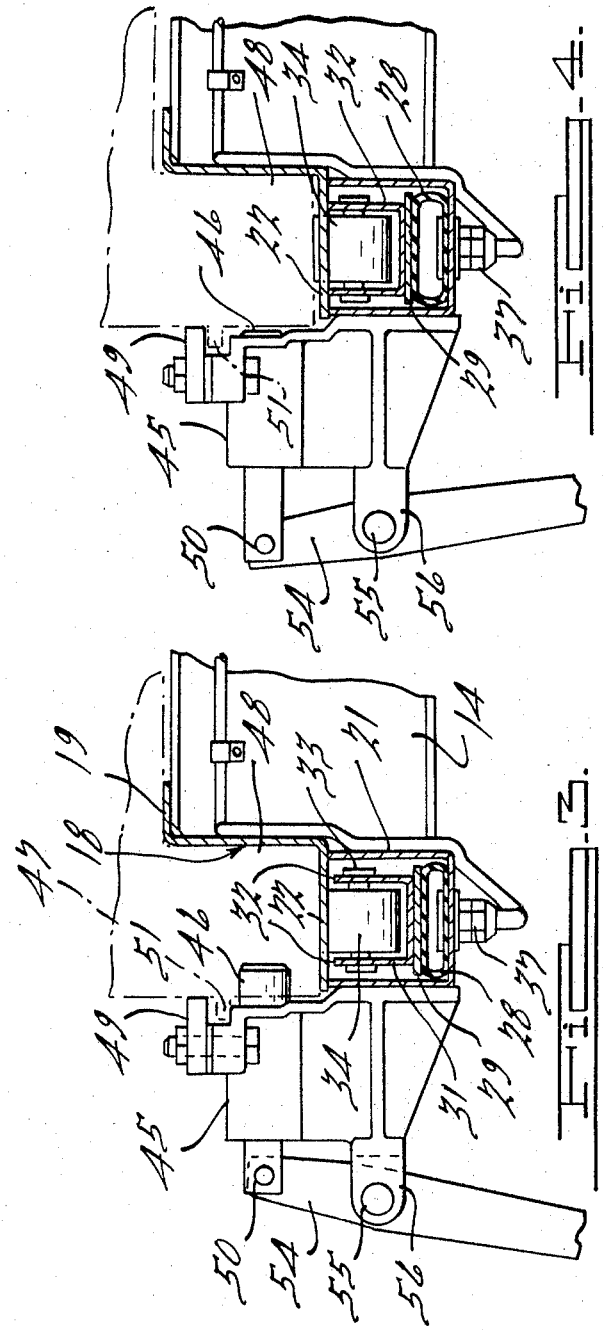

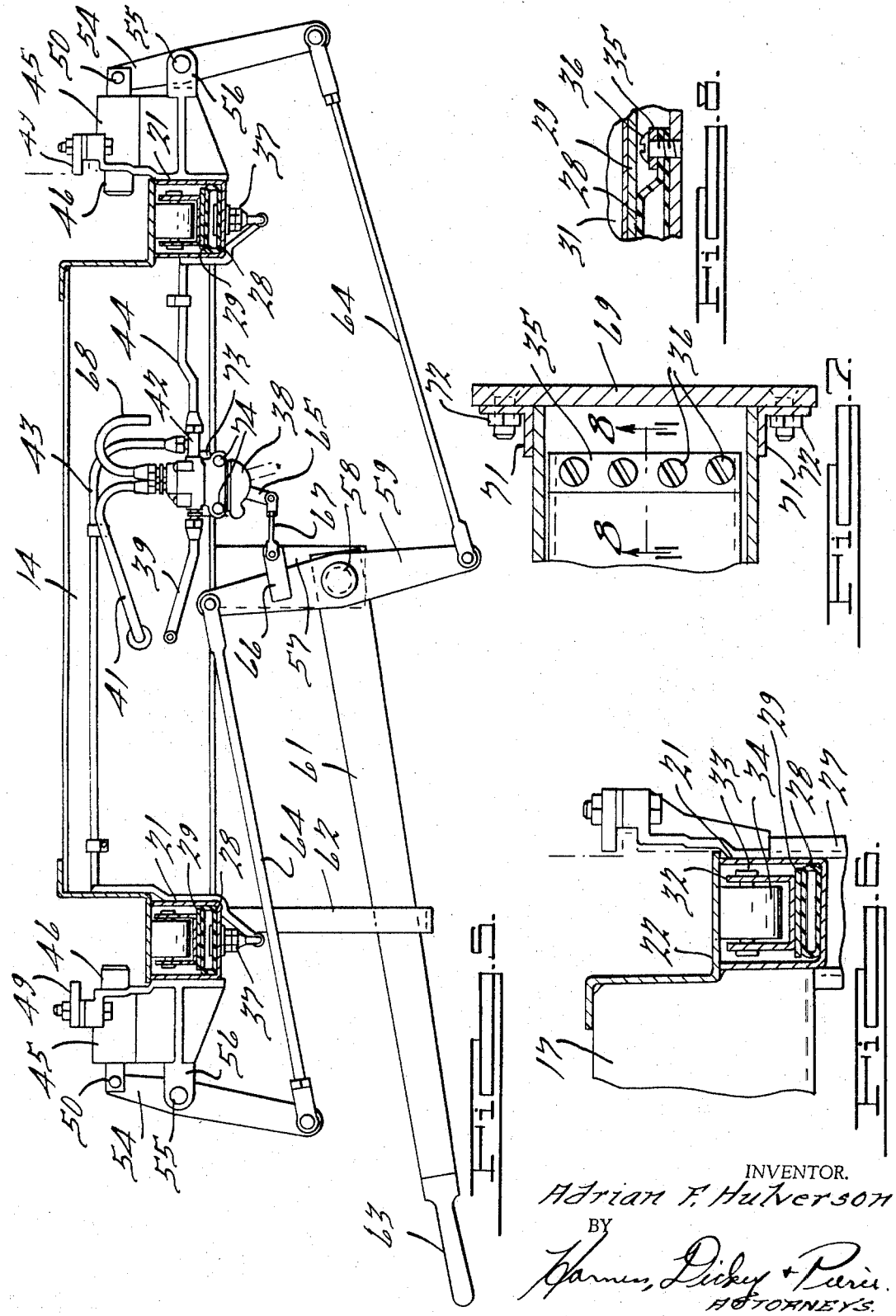

3,425,710
TRAILER CONSTRUCTION
Adrian F. Hulverson, Grosse Pointe Woods, Mich., assignor to Fruehauf Corporation, a corporation of Michigan
Filed July 7, 1967, Ser. No. 651,907
U.S. Cl. 280—81                        6 Claims
Int. Cl. B62d 21/16; A63g 21/00

ABSTRACT OF THE DISCLOSURE

The body or container is supported on a frame which has upwardly facing channels in the side rails in which the downwardly projecting side rails on the body or container are supported and locked in adjusted position. A plurality of rollers are mounted in spaced relation on longitudinal carriers which rest upon an inflatable tube in the bottom of the channels and which, when inflated, raises the rollers through apertures in a plate at the top of the channel into engagement with the bottom rails of the body or container. The body or container is raised above the plates or the rollers so that it can be readily moved longitudinally of the supporting frame thereonto or therefrom.

Cross reference to related application

The structure of the present invention is similar to that which formed the basis of an application for a Letters Patent to Adrian F. Hulverson et al., Ser. No. 297,080 filed July 23, 1963, and now abandoned. The subject matter of the present application is a substantial improvement over that of the abandoned application.

Background of the invention

The invention pertains to trailers or semitrailers having bodies or containers which are movable longitudinally of the supporting frame thereonto or therefrom.

Description of the prior art

In the above set forth patent application, the following patents appear to be pertinent to the invention, that to J. H. Wise, No. 3,011,665, issued Dec. 5, 1961 for "Material Handling Operator" and that to M. S. De Lay, No. 2,589,678, issued Apr. 30, 1963 for "Load Equalizing Device for Trailers."

Summary of the invention

The invention pertains to rail members at each side of a trailer frame having inflatable tubes at the bottom thereof. A roller cage rests upon each tube and supports rollers which project above the rail bottom when the tubes are inflated to permit the trailer body or container to be rolled onto and off the frame. The stem for inflating the tubes is joined to the latter between the end thereof so that air will be freely admitted into the tubes for raising the cage and rollers to operative position.

Brief description of the drawings

FIGURE 1 is a broken plan view of a frame having raisable rollers in the side rails embodying features of the present invention;

FIG. 2 is a broken side view of the structure illustrated in FIG. 1;

FIG. 3 is an enlarged sectional view of the structure illustrated in FIG. 2, taken on the line 3—3 thereof with the rollers in retracted position;

FIG. 4 is a view of the structure illustrated in FIG. 3, with the rollers in raised position;

FIG. 5 is an enlarged sectional view of the structure illustrated in FIG. 1, taken on the line 5—5 thereof;

FIG. 6 is an enlarged, broken sectional view of the structure illustrated in FIG. 2, taken on the line 6—6 thereof;

FIG. 7 is an enlarged, broken sectional view of the structure illustrated in FIG. 2, taken on the line 7—7 thereof, and FIG. 8 is a broken sectional view of the structure illustrated in FIG. 7, taken on the line 8—8 thereof.

Description of the preferred embodiment

The frame 11 has side rails 12 and 13 of the opposite hand, a front cross member 14, a rear cross member 15 and intermediate cross members 16 and 17. The front rail 14 is of inwardly presented channel section to the ends of which angle members 18 of the side rails, having a top flange 19 are welded. A channel shaped member 21 is welded to a horizontal flange 22 of the angle members 18 and also to the ends of the cross members 14, 16 and 17. The flange 22 has a series of apertures 23 therein, and the channel members 21 carry pairs of hanger brackets 25, 26 and 27 for supporting the wheels in the conventional manner. The cross member 15 is an I-beam secured to the bottom of the members 21 and is interconnected between the end pair of hangers 27.

An elastomeric tube 28 is supported in the bottom of the channel members 21 and have an elongated plate 29 resting thereon and on which a channel-shaped cage 31 is supported. Flanges 32 of the cage 31 have shafts 33 extending therethrough for supporting rollers 34 in position to extend through the apertures 23 in the flange 22 of the angle member 18. Both ends of the tubes 28 are squeezed together into sealed relationship by plates 35 which secured the ends against the bottom of the channel member 21 by a plurality of screws 36 which extend through apertures in the tube ends and into threaded apertures in the bottom of the channel member. A stem 37 is sealed to the bottom of the tube 28 near the forward end so that air can be admitted into the tube between the secured ends rather than from one end thereof so as to prevent the air supplied by the stem from being pinched off.

A valve 38 is mounted on the front cross member 14 centrally thereof. The valve 38 has an emergency line 39 to a relay valve, a line 41 to a front supply conduit and a T 42 which is connected by lines 43 and 44 to the stems 37 of the tubes 28. A pair of brackets 45 are mounted at the front of the frame having a retractable pin 46 therein which are movable within apertures in the container 47. The container has a rail 48 at each side which extends beneath holddown plates 49 on the brackets when resting upon the flange 22 of the members 18. Brackets 52 are mounted at the rear end to the frame 11 having holddown plates 53 thereon which extend over the rails 48 at the sides of the container.

The outer ends of the pins 46 have an elongated aperture containing a pin 50 which pivots the pin 46 to a link 54. The link is secured by a pivot 55 to a boss 56 on the bracket 45. A bracket 57 extends downwardly from the cross member 14 and supports a pin 58 on which a link 59 is pivotally mounted. The link 59 is fixed to a lever 61 which is raised and lowered in a U-shaped hanger 62 by a handle 63 on the end thereof. Adjustable rods 64 interconnect the ends of the link 59 to the remote end of the links 54. When the handle is in its downward position, as illustrated in FIG. 5, the pins 46 are moved inwardly in locked engagement within apertures in the container. In this position, the valve 38 has its operating lever 65 moved to "Off" position through the connection of a finger 66 fixed to the link 59 and an adjustable rod 67.

When the container is to be moved on the flange 22 of the members 18, the handle 63 and lever 61 are moved to raised position for retracting the pins 46 and releasing the container, as illustrated in FIG. 4. This opens the valve 38 and permits air to pass through the conduits 43 and 44 into the tubes 28. The inflation of the tubes 28 moves the roller cage 31 upwardly into engagement with the bottom of the flange 22 from the position illustrated in FIG. 3 to the position illustrated in FIG. 4. This moves the rollers 34 above the flange 22, as illustrated in FIG. 4, to raise the rails 48 and container which are supported solely by the rollers. By having the ends of the flanges 32 contact the bottom of the flange 22 throughout the length of the roller cage 31, assurance is had that all of the rollers 34 will project slightly above the flange 22 in position to have the container roll thereon when moved longitudinally of the frame. This movement aligns an aperture at each side of the container with the pins 46.

The downward movement of the handle 63 and lever 61 turns the valve 38 to "Off" position bleeding air through the exhaust pipe 68 and permitting the rollers to be retracted by the weight of the container. The further movement of the handle 63 to "Down" position will engage the pins 46 with the container apertures. The apertures in the rail 48 can be elongated to permit the pins 46 to enter the aperture when the container is slightly raised and when resting upon the flanges 22. The ends of the channel members 21 are enclosed by plates 69 abutting angle members 71 to which they are removably secured by bolts 72. A bracket 73 is welded to the cross member 14 to which the valve 38 is secured by a pair of bolts 74. A pair of brackets 75 are secured to the bottom of the channel member 21 to project inwardly of the side rails 12 and 13. In the present arrangement, the air will be delivered to the tubes 28 between the ends thereof and will always inflate the tubes and raise the rollers above the flanges 22.

What is claimed is:

1. In a trailer frame, a flange containing apertures located at each side of the frame for supporting the rails of a container, a channel member secured to the bottom of the flange, a tube at the bottom of the channel member made of elastomeric material, the ends of the tube being sealed, a stem secured to each tube between the ends thereof and extending through the bottom of the channel members for the passage of air to within the tubes, and a cage having rollers thereon within each channel member supported on said tube and raised thereby when the tube is inflated for raising the rollers above the flanges through the apertures thereof.

2. In a trailer frame as recited in claim 1, wherein the projection of the rollers above the flange is limited by the engagement of the cage with the underface of the flange.

3. In a trailer frame as recited in claim 2, wherein brackets are mounted at the front end of the frame, pins in the brackets for extending into apertures in the container, a link system connected to the pins, and an operating lever for the link system for moving the pins to retracted and extended positions.

4. In a trailer frame as recited in claim 3, wherein a valve is supported by the frame having supply lines to said stems, and means connecting the link system to said valve for moving the valve to "Off" and "On" positions whereby the movement of the handle to retract the pins operates the valve for introducing air into the tubes for raising the rollers above the flanges and the container above the frame.

5. In a trailer frame as recited in claim 4, wherein a second set of brackets are provided at the rear of the frame, and holddown plates on the front and rear brackets which extend over a rail at each side of the container for limiting the upward movement thereof.

6. In a trailer frame as recited in claim 1, wherein the tubes are secured at the ends to the bottom of the channel members by means which seal the ends against the escape of air therefrom.

References Cited

UNITED STATES PATENTS

| 2,589,678 | 3/1952 | De Lay. | |
| 3,011,665 | 12/1961 | Wise. | |
| 3,087,741 | 4/1963 | De Lay | 280—81 |
| 3,146,000 | 8/1964 | Holzman | 280—81 |
| 3,175,717 | 3/1965 | Smith | 214—515 |
| 3,257,124 | 6/1966 | Mendez | 280—415 |
| 3,365,211 | 1/1968 | Ginsburg | 280—81 |

KENNETH H. BETTS, *Primary Examiner.*

U.S. Cl. X.R.

104—135